United States Patent
Wambeke et al.

[11] Patent Number: 5,883,333
[45] Date of Patent: Mar. 16, 1999

[54] CABLE SPLICE CLOSURE

[75] Inventors: Alain Wambeke, Zoutleeuw; Jesper Damm, Kessel-Lo; Etienne Laeremans, Scherpenheuvel-Zichen, all of Belgium

[73] Assignee: N.V. Raychem S.A., Kessel-Lo, Belgium

[21] Appl. No.: 809,035

[22] PCT Filed: Sep. 19, 1995

[86] PCT No.: PCT/GB95/02227

§ 371 Date: Jul. 22, 1997

§ 102(e) Date: Jul. 22, 1997

[87] PCT Pub. No.: WO96/09670

PCT Pub. Date: Mar. 28, 1996

[30] Foreign Application Priority Data

Sep. 21, 1994 [GB] United Kingdom .................... 9419033
Mar. 6, 1995 [GB] United Kingdom .................... 9504451

[51] Int. Cl.⁶ .................................................. H02G 15/08
[52] U.S. Cl. .............................................................. 174/92
[58] Field of Search ................................... 174/92, 77 R, 174/74 R, 84 R, 93, 84 C, DIG. 8

[56] References Cited

U.S. PATENT DOCUMENTS

| | | | |
|---|---|---|---|
| 3,064,072 | 11/1962 | Graff et al. | 174/84 R X |
| 3,775,204 | 11/1973 | Thompson et al. | 174/92 X |
| 3,808,353 | 4/1974 | Burtelson | 174/92 |
| 4,107,451 | 8/1978 | Smith, Jr. et al. | 174/84 R |
| 4,632,488 | 12/1986 | Long et al. | 439/452 |
| 4,692,565 | 9/1987 | Koht et al. | 174/77 R X |
| 4,733,629 | 3/1988 | Hunt et al. | 138/129 X |
| 4,933,512 | 6/1990 | Nimiya et al. | 174/92 |
| 4,942,270 | 7/1990 | Gamarra | 174/77 R X |
| 4,963,698 | 10/1990 | Chang et al. | 174/77 R |
| 5,113,038 | 5/1992 | Dehling | 174/77 R X |
| 5,288,947 | 2/1994 | Stewing | 174/92 |
| 5,313,019 | 5/1994 | Brusselmans et al. | 174/77 R X |

FOREIGN PATENT DOCUMENTS

| | | | |
|---|---|---|---|
| 0 538 008 A3 | 4/1993 | European Pat. Off. | H02G 15/013 |
| 2 427 668 | 12/1979 | France | H01B 17/58 |
| 0206854 | 5/1986 | France | |
| 20 12 631 | 9/1971 | Germany | H02G 15/18 |
| 27 43 937 | 5/1979 | Germany | H02G 15/18 |
| WO 81/01487 | 5/1981 | WIPO | H02G 15/10 |
| WO9205609 | 4/1992 | WIPO | |
| WO 93/26070 | 12/1993 | WIPO | H02G 15/013 |

Primary Examiner—Dean A. Reichard
Attorney, Agent, or Firm—Herbert G. Burkard

[57] ABSTRACT

A cable splice closure is disclosed, which includes a casing which, in use, is closed around a cable splice; and at least one cable gripper comprising a strip which, in use, is wound around at least one cable extending into the casing. Closing the casing, in use, automatically causes the or each strip to tighten around the or each cable around which it is wound, thereby gripping the cable. The cable gripper strip may have the ability to decrease in length when wound and compressed around a cable, thereby allowing it to contract, and therefore tighten, around the cable.

24 Claims, 11 Drawing Sheets

PART A

PART B

PART A

PART B

PART A

CABLE SPLICE CLOSURE

BACKGROUND OF THE INVENTION

FIELD OF THE INVENTION

The present invention relates to a cable splice closure, for example for telecommunications or electrical cables. The invention also relates to a device for gripping a cable, which device may, for example, form part of a cable splice closure. Although the invention is particularly applicable to the splicing and gripping of cables (including copper wire cables, optical fibre cables, wires, and optical fibres), at least some embodiments of the invention may be applicable to the splicing and gripping of pipes (especially district heating pipes) or other elongate objects. Hence, even though, throughout the specification, cables are referred to, it is to be understood that pipes or other elongate objects may, at least in some embodiments of the invention, be substituted for cables.

INTRODUCTION TO THE INVENTION

Many different types of cable splice closures are known. For example, International Patent Application published under the number WO 93/26070 (Raychem) discloses a cable sealing device (e.g. a cable splice closure) which comprises a housing into which the cable passes, a sealing material that seals a gap between the cable and the housing, and means for transmitting an axial force in the cable to the housing other than through the sealing material, the means allowing substantially radial movement of the cable. In preferred embodiments of the cable sealing device, the axial force transmitting means comprises a transverse member having substantially radially-extending slots within which cable clamps in the form of hose clamps or jubilee clips can slide.

European patent application no. 0538008 discloses a cable splice enclosure comprising first and second elongate casings which define a housing which is filled with an encapsulant. An end plate assembly is located at each end of the housing, and comprises a base plate and a cover plate. Each end plate assembly defines cable-receiving recesses of generally U-shaped configuration into each of which a cable seal formed from resilient material (e.g. thermoplastic rubber) is inserted. In order to form a seal between each cable seal and its respective cable extending through it, the base plate and the cover plate are forced towards each other by tightening nuts on bolts connecting the two plates, which has the effect of compressing the cable seals. Strain-relief for the cables may be provided by a central support extending longitudinally from each end plate, the support having concave arcuate portions which have teeth to penetrate the insulation of cable jackets under the influence of a clamp tightened around the support and the cables.

U.S. Pat. No. 4,387,268 discloses a sleeve for protecting a splice of electric or telephone cables, which is made up of two half-shells joined together by their adjacent edges around the splice. These adjacent edges are provided with a groove which, when the half-shells are joined together, defines a duct into which pasty material (self-curing silicone or polyurethane elastomer) can be injected in order to create water-tightness between the edges. The opposite ends of the sleeve are provided with detachable jaws for securing axially the ends of the cables to the sleeve. Between at least two such detachable jaws is a chamber connected with the duct.

SUMMARY OF THE INVENTION

An object of the present invention is to provide a cable splice closure and a device for gripping a cable which are simpler than known closures and gripping devices such as the closures disclosed in WO 93/26070, EP 0538008 and U.S. Pat. No. 4,387,268 and which consequently may be easier to manufacture and, more importantly, easier to install. It is a further object of the invention to provide such simplified closures and devices substantially without detriment to the mechanical and environmental protection provided to cables and splices around which they are installed, and preferably to improve such mechanical and environmental protection. A particular object of the invention is to provide simple yet effective protection against forces, particularly axial forces, which may act on cables around which cable splice closures or gripping devices are installed, and to simplify the manner in which such protection is achieved, while substantially ensuring that any environmental sealing which may be necessary is not impaired.

According to a first aspect of the invention, there is provided a cable splice closure, comprising:
 (a) a casing which, in use, is closed around a cable splice; and
 (b) at least one cable gripper comprising a strip which, in use, is wound (at least partly) around at least one cable extending into the casing;
wherein closing the casing, in use, automatically causes the or each strip to tighten around the or each cable around which it is wound, thereby gripping the cable.

The invention has the advantage that it provides a cable splice closure which is normally very easy to install around a splice but which nevertheless normally provides excellent mechanical, and preferably also environmental, protection for the splice. In particular, because the or each cable gripper comprises a strip which is wound around one or more cables (thereby building up the cables to match the size of apertures in the casing in which the cables are to lie) and which is automatically tightened around the cables when the casing is closed, the necessity of performing separate operations to secure the cables to the closure (e.g tightening clamps around the cables, which is the case with the known closures disclosed in WO 93/26070 and EP 0538008 for example) is normally avoided. In addition, because the or each cable gripper is in the form of a strip, it is normally a simple matter, where necessary, to choose the correct length of strip, or to cut a strip to the correct length for example, for each diameter of cable, in order to ensure that the cables are gripped properly. This is in contrast to the sleeve disclosed in U.S. Pat. No. 4,387,268, for example, in which it is necessary in one embodiment to provide a whole range of jaws each having different diameters of cable apertures so that the correct jaws may be chosen for each application, or in another embodiment to cut away exactly the correct amounts from each jaw in order to create the correct size of cable aperture. With the sleeve of U.S. Pat. No. 4,387,268, the installation engineer is required either to make sure that he carries with him a large number of different jaws or to carry out a number of intricate cutting operations on several such jaws at the time of installation (the sleeve of U.S. Pat. No. 4,387,268 has twelve discrete jaw pieces which need to be inserted into it). The present invention normally eases the burden on the installation engineer, preferably making installation times shorter and advantageously making installation itself easier and hence less prone to mistakes which might compromise the integrity of the closure.

In a preferred embodiment of the invention, the or each cable gripper strip can decrease in length when wound and compressed around a cable, and preferably the strip tightens around a cable by contracting around the cable as a result of such a decrease in length, when compressed. Preferably, therefore, closing the casing, in use, compresses the or each cable gripper strip around the cable(s), causing the strip to contract, and therefore tighten, around the cable as a result of such a decrease in length. Advantageously, the cable splice closure may further comprise sealing material (e.g. a preferred sealing material as described below) situated next to the, or at least one of the, cable gripper strip(s) when the strip is, or the strips are, wound around one or more cables. The sealing material preferably forms a seal, in use, around the cable(s), e.g. between the cables and the casing. The or each cable gripper strip may advantageously contribute to the retention of the sealing material in the casing. Preferably, the sealing material is situated, preferably retained, between at least two cable gripper strips when the strips are wound around one or more cables in use.

In embodiments of the invention in which sealing material is present, the sealing material is preferably put under pressure in use. This can advantageously increase the sealing ability of some sealing materials, e.g. gel. Preferably, therefore, a compressive force is applied to the sealing material in use. Compressive forces may advantageously be applied to the sealing material by means of the casing (e.g. by closing the casing around the sealing material) and/or by means of the or each cable gripper and/or by other means (e.g. by means of one or more support members described below). The compressive force may, for example, be applied to the sealing material by forcing the cable grippers and/or support members relatively closer together. The compressive force(s) may advantageously be applied to the sealing material by resilient biassing means which can maintain a compressive force on the sealing material despite some movement and/or shrinkage of the sealing material, e.g. due to changes in temperature. The resilient biassing means may, for example, comprise a spring or other resilient device.

Advantageously, where two or more cable grippers are present, one or more connecting members may extend between them. For example, if two or more cable gripper strips are wound around the same cables, one or more connecting members may extend between the strips. This is particularly preferred where there is sealing material situated between the two or more wound cable gripper strips. The connecting members may be flexible or substantially rigid, and they may comprise webs, sheets, rods, screws, bolts etc. The connecting member(s) may advantageously be used to force the cable grippers (especially in the form of wound strips) relatively closer together in order to apply a compressive force to the sealing material.

In another preferred embodiment, the cable splice closure according to the first aspect of the invention further comprises (c) a support member which supports, preferably retains, the, or at least one of the, cable gripper strip(s) in use. The support member may advantageously have at least one opening in which the, or at least one of the, cable gripper strip(s) is supported, preferably retained, in use. The, or at least one of the, opening(s) in the support member preferably comprises a transverse recess.

According to a second aspect of the invention, there is provided a cable splice closure, comprising:

(a) a casing which, in use, is closed around a cable splice;
(b) at least one support member which has at least one transverse recess through which a cable extending, in use, into the casing, extends, and which, in use, is preferably located at least partly inside the casing; and
(c) at least one cable gripper which in use is situated in the, or at least one of the, recess(es) of the support member;

wherein closing the casing, in use, automatically urges the or each cable gripper against a said cable extending into the casing, thereby causing the cable gripper to grip the cable.

The second aspect of the invention has the advantage that because closing the casing around the cable splice automatically urges the or each cable gripper against a cable extending through a recess (in which the cable gripper is situated) and into the casing, thereby causing the cable gripper to grip the cable, it is generally not necessary to perform a separate operation (such as tightening a clamp around the cable or cables) in order to cause the cable(s) to be gripped. This is in contrast to the closures disclosed in WO 93/26070 and EP 0538008, for example, in which such a separate cable clamping operation is normally necessary. The invention also has the advantage that, because the cables are normally not gripped until the casing is closed around the splice, it normally avoids the need for the installation engineer to secure the cable gripper(s) to the cable(s) at exactly the correct position before closing the casing. The cable gripper (s) will normally be automatically positioned correctly on the cable(s) when the casing is closed, and will automatically grip the cable(s) upon closure of the casing. In contrast, with the known closures disclosed in WO 93/26070 and EP 0538008, for example, it is normally necessary for the installation engineer to secure the cable grippers (hose clamps) tightly to the cables at exactly the correct positions before closing the casing around the splice.

The second aspect of the invention also has an advantage over the sleeve disclosed in U.S. Pat. No. 4,387,268 in that because it has a support member which has at least one transverse recess (preferably a plurality of such transverse recesses) through which, in use, a cable extends and in which at least one cable gripper is situated, cables extending into the casing can normally be organised (i.e. arranged, and preferably also gripped) substantially independently of each other. With the sleeve of U.S. Pat. No. 4,387,268, when it is necessary to accommodate two cables in a single end of the sleeve, both cables must be secured between the same jaw pieces, and so if it is necessary to remove or add one cable, the securement of the other cable must also necessarily be disturbed. In contrast, the cable splice closure of the second aspect of the invention normally enables each cable (or each group of cables, if desired), to be accessed substantially without having to disturb (at least to a significant extent) the other cables (or groups of cables). It should also be noted that the present invention, at least in its broadest sense, normally enables two, three, four, or even more, cables to be accommodated, preferably substantially independently of each other.

The or each cable gripper may be automatically urged against one or more cables extending into the casing in use by being moved towards the cable(s) by the closing of the casing. For example, the or each cable gripper may comprise at least one part which is slidable or otherwise movable in the or each recess, preferably such that it is automatically moved inwards in a respective transverse recess in the support member when the casing is closed. Additionally or alternatively, the automatic urging of the cable gripper against one or more cables extending into the casing in use preferably comprises contraction of the cable gripper at least partly, preferably completely, around the cable(s). Advantageously, the or each cable gripper may comprise a strip which, in use, is wound (at least partly) around one or more said cables extending into the casing, and which preferably grips a said cable by tightening around the cable. It is particularly preferred that the or each cable gripper strip can decrease in length when wound and compressed around a cable, and that the strip tightens, in use, around a cable by contracting around the cable as a result of such a decrease in length. Such a form of cable gripper has the advantages of simplicity of construction and ease of use. Preferred embodiments of the cable gripper are described in more detail below.

A third aspect of the invention also advantageously utilizes one or more cable grippers in the form of such a strip. According to this third aspect of the invention, there is provided a cable splice closure, comprising:

(a) a casing which, in use, is closed around a cable splice;

(b) at least one support member which has at least one transverse recess through which a cable extending, in use, into the casing, extends; and (c) at least one cable gripper which may be situated in the, or at least one of the, recess(es) of the support member;

wherein the or each cable gripper comprises a strip which when wound and compressed around a cable can decrease in length and can thereby contract around the cable, and a cable extending into the casing through a said recess in use may be gripped by means of such contraction of a said cable gripper situated in the said recess.

The cable splice closure according to the third aspect of the invention incorporates the particularly simple and effective preferred form of cable gripper described above. Preferably, as with the cable splice closure according to the first and second aspects of the invention, closing the casing, in use, automatically urges the or each cable gripper against a cable extending into the casing, thereby causing the cable gripper to grip the cable.

A fourth aspect of the invention provides a device for gripping a cable, comprising:

(a) at least one support member which has at least one recess which, in use, is substantially transverse with respect to a cable extending through the recess; and (b) at least one cable gripper which may be situated in, preferably retained in, the, or at least one of the, recess(es) of the support member;

wherein the or each cable gripper comprises a strip which when wound and compressed around a cable can decrease in length and can thereby contract around the cable, and a cable extending through a said recess in use may be gripped by means of such contraction of a said cable gripper situated in the said recess. The device may, for example, be utilized in a cable splice closure in order to secure the cable(s) with respect to the casing or another part (e.g. one or more tie bars) of the closure.

Preferred embodiments of the invention described herein may advantageously be present in the first, second, third and/or fourth aspects of the invention.

Advantageously, the or each cable gripper may be retained in the recess in the support member (where present) in which it is situated, preferably such that longitudinal movement of the cable gripper with respect to the support member is substantially prevented, and when the cable gripper grips a cable extending into the casing, the cable is preferably consequently secured with respect to the support member.

The terms "longitudinal" and "transverse" as used herein refer to directions in relation to the directions in which the cable(s) generally extend upon entering the casing or, with regard to the device according to the fourth aspect of the invention, in relation to the directions in which the cables generally extend through the device. "Longitudinal" means generally in the direction of extension of the cables, and "transverse" means generally transverse (preferably substantially perpendicular) with respect to the direction of extension of the cables.

In preferred embodiments of the invention which include a support member, in use, (immediately) prior to closing the casing, part of the or each cable gripper protrudes out of the recess in which it is situated, and closing the casing (around the support member) automatically forces at least some of the protruding part of the cable gripper into the recess and thereby urges the cable gripper against the cable extending through the recess. By "protruding" is preferably meant that part of the cable gripper extends beyond an imaginary line extending between the two sides of the recess at the transverse periphery of the support member, which imaginary line generally extends the shape of the periphery of the support member across the mouth of the recess. For example, if, as will normally be the case, the support member has a generally convex (e.g. generally round, preferably substantially circular) transverse periphery, the imaginary line will normally extend the convex shape of the periphery of the support member across the mouth of the recess.

Additionally or alternatively, part of the casing (which may be integral with, or merely attached to, the casing) may protrude into the or each recess in the support member when the casing is closed in use, and closing the casing in use automatically forces the or each cable gripper further into the recess in which it is situated, thereby urging the cable gripper against the cable extending through the recess.

The casing of the cable splice closure may, for example, be formed from metal (e.g. Aluminium) and/or a plastics material (e.g. polypropylene or polyethylene, especially ultra-high molecular weight polyethylene). When the casing is made from a plastics material, it may advantageously be moulded e.g. blow-moulded.

In preferred embodiments of the invention, the casing may be opened along its length, to permit so-called "side-entry" of spliced cables into the casing. The casing may conveniently be of so-called wraparound configuration (which term includes the use of half- or multi-shell and generally clam-shell like constructions), for example having a longitudinal split which may be opened out to permit side-entry of spliced cables and subsequently closed to enclose the spliced cables in the casing. Even more preferably, the casing may comprise two or more separable parts which may be separated to permit spliced cables to be inserted into the casing, and subsequently reassembled to close the casing. A particularly preferred form of casing comprises two half-shells which are separable in a longitudinal (with respect to the spliced cables) direction. Opposing edges of the casing may generally be fastened together by any suitable means, e.g. one or more bolts or screws or the like and/or one or more clasps or the like and/or one or more elongate fastening members which may extend along at least part of the length of the casing (e.g. one or more rods or like member(s) extending through one or more cooperating parts of the casing, or one or more channel member(s) extending around one or more rails or flanges of the casing).

According to preferred embodiments of the invention, the cable gripper strip comprises one or more, preferably a plurality, or collapsible portions, and the strip can decrease in length due to the collapsing of one or more of the collapsible portions. The collapsible portion(s) may collapse by means of any of a variety of mechanisms, for example by telescoping (in a manner similar to a collapsible telescope). Preferably, however, the or each collapsible portion can collapse by deforming, e.g. by being crushed or by buckling. Preferably such deformation occurs in a direction generally or substantially parallel to the (longitudinal) direction of extension of the cable around which the strip is wound, in use, and can be directed inwardly and/or outwardly, preferably outwardly, with respect to the remainder of the strip.

This generally has the advantage of not giving rise to the formation of gaps (or at least significant gaps) between the windings of the strip through which sealing material might otherwise be able to escape (the cable gripper strip(s) may contribute to the retention of sealing material, as explained below). The or each collapsible portion preferably comprises a relatively weak portion of the cable gripper strip. More preferably, the or each collapsible portion comprises one or more webs extending between substantially non-collapsible portions, e.g. one or more relatively thin portions which can deform, e.g. by buckling.

Some of the tightening of the cable gripper strip around a cable may, at least in some embodiments, occur by additional coiling-up of the strip, i.e. the coils may tighten by sliding over each other.

Preferably the decrease in length of the strip when wound and compressed around a cable is distributed substantially along the entire length of the strip, e.g. at a plurality of discrete locations distributed along the length of the strip. For example, the cable gripper strip comprises a plurality of alternately collapsible and substantially non-collapsible portions along at least part, preferably all, of the length thereof. This has the advantage of normally providing substantially uniform collapsibility along the length of the strip, such that the strip may contract relatively or substantially uniformly around a cable.

The or each collapsible portion (where present) of the cable gripper strip may advantageously provide the flexibility to enable the cable gripper strip to be wound around a cable. The or each substantially non-collapsible portion may, for example, be relatively or substantially inflexible: this stiffness can have the advantage of enabling the substantially non-collapsible portions of the strip to grip a cable relatively firmly. Advantageously, therefore, the cable gripper strip may comprise a plurality of alternately substantially inflexible and flexible portions along at least part of its length.

According to particularly preferred embodiments of the invention, the cable gripper strip is profiled such that, when spirally wound around a cable in use, successive windings interlock with each other, thereby substantially preventing helical displacement of the windings with respect to each other along the cable. This may provide at least two important advantages. Firstly, it generally provides the cable gripper strip with strength to resist axial forces acting on a cable when it is wound around the cable, i.e. it can substantially prevent the strip from telescoping out along the cable under the action of such axial forces, and therefore the grip of the strip on the cable can normally be maintained. Secondly, it generally prevents accidental displacement of the windings of the strip with respect to each other (e.g. due to axial forces on the cable or for some other reason), which might otherwise compromise the ability of the strip to retain sealing material. The cable gripper strip may, for example, have a plurality of protrusions and recesses which can engage with each other when the strip is wound in use. More preferably, the or each substantially non-collapsible portion (where present) of the cable gripper strip has one or more projections on one surface thereof and one or more cooperating recesses on the opposite surface thereof, such that, for example, when the strip is wound around a cable the projection(s) of one non-collapsible portion fit together with the recess(es) of another non-collapsible portion which it overlaps, or by which it is overlapped.

Preferably, the cable gripper strip has a plurality of protrusions on a surface thereof, to enhance the grip of the cable gripper strip on one or more cables around which it is wound in use. These protrusions may advantageously comprise protrusions which fit into cooperating recesses as described above. Preferably these protrusions are located only on the or each substantially non-collapsible portion (where present). The protrusions may, for example, penetrate part of a cable (e.g. the outer jacket of a cable) or they may merely press against the cable.

Preferably, the or each cable gripper is formed from a plastics material, e.g. polyethylene, especially ultra-high molecular weight polyethylene, or polypropylene. Additionally or alternatively, other materials, e.g. metal (especially steel or aluminium), may be used, at least in some embodiments of the invention.

The or each support member (where present) is preferably substantially rigid. Preferably, the or each support member is formed from a plastics material, e.g. polyethylene, especially ultra-high molecular weight polyethylene, or polypropylene. Additionally or alternatively, other materials, e.g. metal (especially steel or aluminium), may be used, at least in some embodiments of the invention.

The or each support member preferably has a plurality of transverse recesses. The recesses may advantageously help to organize a plurality of cables extending into the splice closure casing. Preferably, each recess contains, in use, no more than one cable extending into the casing, although in some embodiments one or more of the recesses may accommodate a plurality of cables. Likewise, the or each recess preferably contains, in use, no more than one cable gripper, although, in some embodiments, a plurality of cable grippers may be situated in one or more of the recesses. If a recess does not have a cable extending through it, the recess preferably contains a plug to block the recess. The plug may advantageously include sealing material (e.g. a preferred sealing material as described below).

In the broadest aspect of the invention, the or each recess of the or each support member generally comprises a space set back in a transverse (preferably substantially radial) direction in the support member, and preferably from the transverse periphery of the support member. The or each recess may advantageously be in the form of a slot. The or each support member may, for example, comprise a frame in which one or more recesses (e.g. slots) are provided. Preferably, however, the or each support member is in the form of a (transverse) plate in which one or more recesses (e.g. slots) are provided.

Preferably the or each recess has an internal profile which can cooperate with a cable gripper situated, in use, in the recess, for example substantially to prevent longitudinal movement of the cable gripper with respect to the support member. For example, the internal profile may comprise one or more transverse grooves and/or ridges which may cooperate (e.g. interlock) respectively with one or more projections and/or recesses on the cable gripper.

The or each support member may advantageously be modular, comprising a plurality of parts assembled together. Preferably at least one support member part provides at least one transverse recess of the support member. Even more preferably, each support member part may provide either at least one transverse recess or no transverse recess, the support member parts being selected to provide a desired number and/or arrangement of transverse recesses.

The or each (modular) support member may advantageously be formed from a kit of parts. Preferably the kit comprises a plurality of parts, one or more parts of which have at least a portion of one or more cable entry opening(s) (preferably transverse recess(es)), and one or more parts of which have no cable entry openings (e.g. transverse recesses) or portions of cable entry openings (e.g. transverse recesses). Preferably some of the parts may be selected from the kit, and a modular support member having a desired number and/or arrangement of cable entry openings (e.g. transverse recesses) may be assembled from the selected parts. Even more preferably, the or each cable entry opening (e.g. transverse recess) is formed in a single part. Advantageously, the or each support member may comprise at least two plates between which, at least in use, is sealing material, and each support member part may comprise part of one of the plates. Advantageously, where present, at least the or each support member part which provides no transverse recesses at least contributes, in use, to retaining the sealing material between the plates of the support member.

Each support member part may advantageously be directly attached to another support member part, preferably by means of one or more interlocking projections and openings.

Preferably, the cable splice closure or device according to all aspects of the invention includes sealing material, e.g. to form an environmental seal around the cable(s) entering the splice closure casing or around the cable(s) extending through the cable gripping device. Advantageously, the or each support member (where present) may at least contribute to retaining sealing material which may, for example, be next to the support member. Even more advantageously, the or each support member may comprise at least two plates between which, at least in use, is sealing material.

The sealing material is preferably pressurized in use. For example, when the casing of the cable splice closure is closed, the sealing material may be placed under pressure by the closing action of the casing. Additionally or alternatively, there may be some other pressurizing means which puts the sealing material under pressure. For example, the plates (where present) of the support member may, in some embodiments, be moved relatively closer to each other in order to pressurize sealing material situated between them. This advantageously may be achieved by means of one or more screws or bolts or other members extending between the plates.

The sealing material used in the invention may generally comprise any suitable sealing material. One preferred form of sealing material comprises a mastic, most preferably having a high compression set and minimum creep properties. The mastic preferably comprises one or more substantially non-crystalline materials, e.g. bituminous materials, elastomeric materials, and/or thermoplastic polymers. The mastic may contain one or more fillers or other additives. Examples of mastics which can generally be used as the sealing material of the present invention are disclosed in U.S. Pat. No. 3,243,211, 3,297,819, 3,396,460 and 4,206,786. The entire disclosure of each of these patents is incorporated herein by reference. An advantageous property of mastic is that during the formation of a seal, it is normally deformable and generally able to flow easily, but after some time it is normally stable, and may have a high mechanical strength. Preferably the mastic has a softening point (when measured according to ASTM E28) of about 130° C., and when subjected to a rolling drum peel test at 23° C. (according to test QAPK 027) preferably has a peel strength of about 130 N/25 mm. A preferred mastic has a sheer strength (when tested according to ISO04587) of greater than 160 N preferably greater than 250 N. Mastics preferred for this invention have high, generally 100%, compression set.

The sealing material may additionally or alternatively comprise gel. The gel may, for example, comprise silicone gel, urea gel, urethane gel, thermoplastic gel, or any suitable gel or gelloid sealing material. Preferred gels comprise an oil-extended polymer composition. Preferably the gel has a hardness at room temperature as determined using a Stevens-Volland Texture Analyser of greater than 45 g, particularly greater than 50 g, especially greater than 55 g, e.g. between 55 g and 60 g. It preferably has a stress-relaxation of less than 12%, particularly less than 10% and especially less than 8%. Ultimate elongation, also at room temperature, is preferably greater than 100%, more preferably greater than 600%, especially greater than 1000%, particularly greater than 1400%, as determined according to ASTM D638. Tensile modulus at 100% strain is preferably at least 1.8 MPa more preferably at least 2.2 MPa. In general compression set will be less than 35%, especially less than 25%. Preferably, the gel has a cone penetration as measured by ASTM D217 of at least 50 ($10^{-1}$ mm), more preferably at least 100 ($10_{-1}$ mm), even more preferably at least 200 ($10^{-1}$ mm) and preferably no greater than 400 ($10^{-1}$ mm), especially no greater than 350 ($10^{-1}$ mm). The polymer composition of the gel may for example comprise an elastomer, or a block copolymer having relatively hard blocks and relatively elastomeric blocks. Examples of such copolymers include styrene-diene block copolymers, for example styrene-butadiene or styrene-isoprene diblock or triblock copolymers e.g. as disclosed in international patent publication number WO 88/00603. Preferably, however, the polymer composition comprises one or more styrene-ethylene-propylene-styrene block copolymers, for example as sold under the Trade Mark 'Septon' by Kuraray of Japan. The extender liquids employed in the gel preferably comprise oils. The oils may be hydrocarbon oils, for example paraffinic or napthenic oils, synthetic oils for example polybutene or polypropene oils, and mixtures thereof. The preferred oils are mixtures of non-aromatic paraffins and naphthenic hydrocarbon oils. The gel may contain additives, e.g. such as moisture scavengers (e.g. Benzoyl chloride), antioxidants, pigments and fungicides.

Other sealing materials which can be used include elastomeric materials, e.g. natural or synthetic rubber, adhesives, especially pressure sensitive adhesives, or grease, e.g. silicone grease.

The sealing material, may, in some embodiments of the invention have substantially the same transverse cross-sectional shape as the or each support member, or may at least have one or more pre-formed transverse recesses through which one or more cables may extend. In other embodiments, the cable(s) may simply be pushed into the sealing material such that the "recess(es)" are only formed at this time.

The cable splice closure according to the invention preferably includes means for securing the or each support member and/or cable gripper with respect to the casing. The securing means preferably comprises profiling on at least the inside of the casing, which profiling cooperates with the, or at least one of the, support member(s) (where present) and/or cable gripper(s) to secure the support member with respect to the casing when the casing is closed in use. The profiling may, for example, comprise one or more transverse grooves and/or ridges.

BRIEF DESCRIPTION OF THE DRAWINGS

The invention will now be described, by way of example, with reference to the accompanying drawings, of which.

DETAILED DESCRIPTION OF THE INVENTION

Figure 1A:
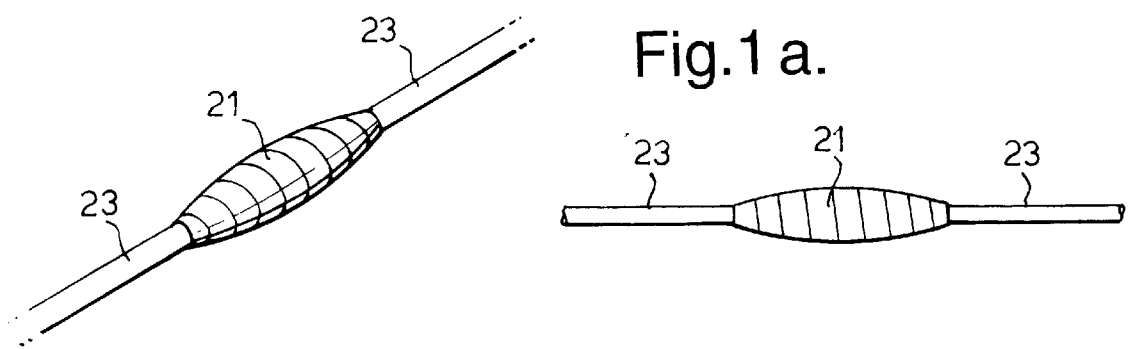
FIG. 1(*a* to *e*) shows a cable splice closure according to the invention being installed around a splice.
Figure 1B:
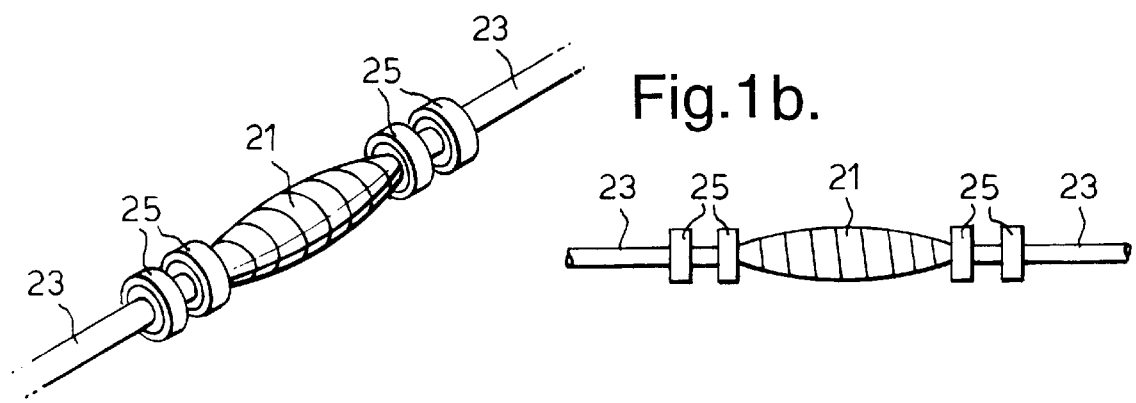
Figure 1C:
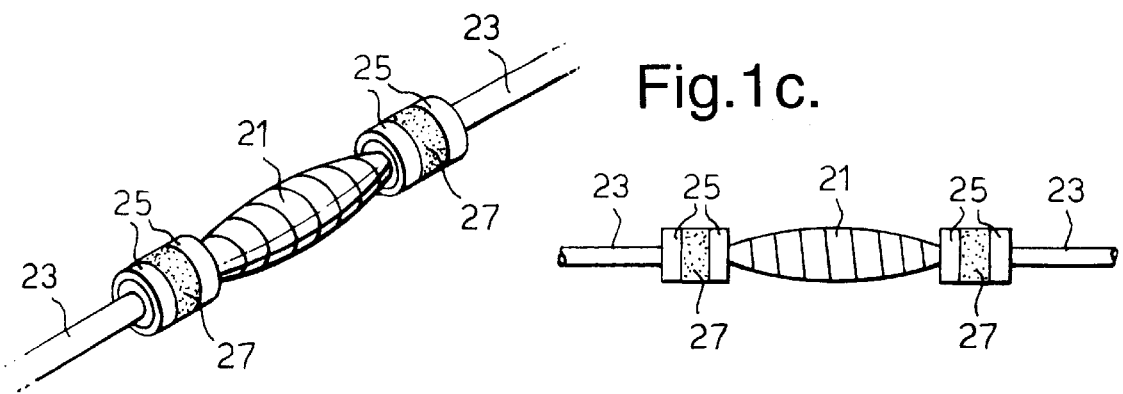

FIG. 1a shows a splice 21 between cables 23 (e.g. telecommunications cables or electrical cables). In FIG. 1b and 1c, two end parts of a cable splice closure according to the invention are placed on the cables 23, one end part being located at each end of the splice 21. Each end part comprises a pair of cable grippers in the form of strips 25 wound around the cables 23 and, as shown in FIG. 1c, sealing material 27 situated between the cable gripper strips 25. The sealing material 27 may, for example be in the form of a tape or strip which is wound around the cable 23.

Figure 1D:
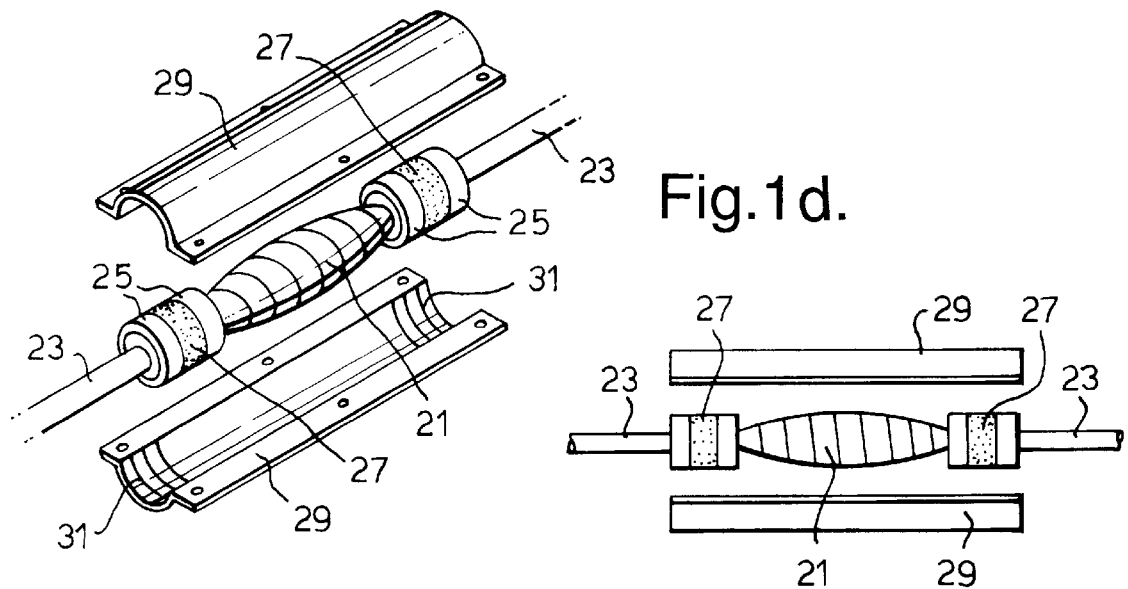
Figure 1E:
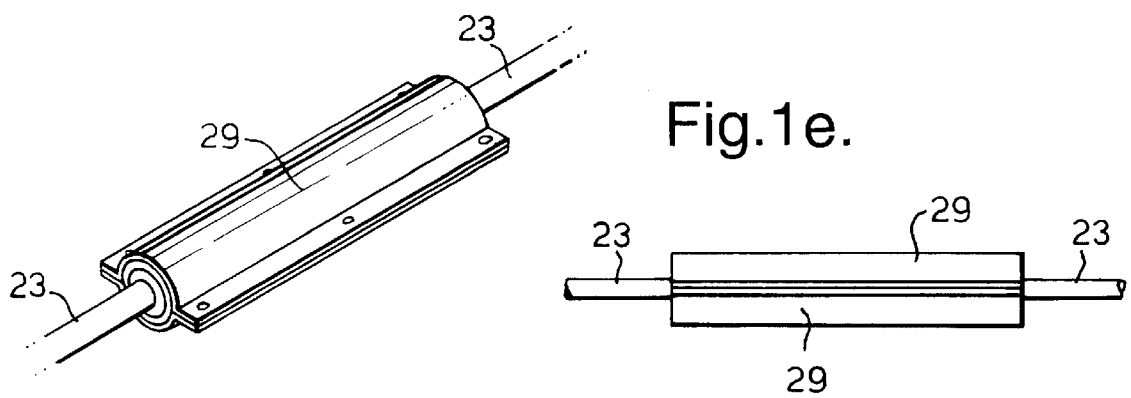

In FIG. 1d, a casing 29 in the form of two half-shells, is shown about to be closed around the splice 21 and the end parts (comprising cable gripper strips 25 and sealing material 27). The inside of the casing 29 has profiling 31 in the form of transverse grooves and/or ridges with which the wound cable gripper strips 25 cooperate (e.g. interlock), when the casing is closed, to secure the cable gripper strips 25 to the casing 29. In FIG. 1e, the casing 29 has been closed around the splice 21 and the cable gripper strips 25 and sealing material 27. The casing 29 has been closed by bringing together the two half-shells and fastening together the longitudinal edges of the half-shells, for example by means of bolts or screws or other fastening means. Closing the casing 29 around the splice has applied pressure to the sealing material 27 between the cable gripper strips 25 (enhancing the effectiveness of the seal) and has also automatically caused each cable gripper strip 25 to tighten around the cable 23, thereby gripping the cable. Each cable gripper strip 25 is so formed that it can decrease in length when wound, and compressed, around a cable, and closing the casing has compressed each strip around the cable 23, thereby causing the strip to contract around the cable as a result of such a decrease in length.

Figure 2A:
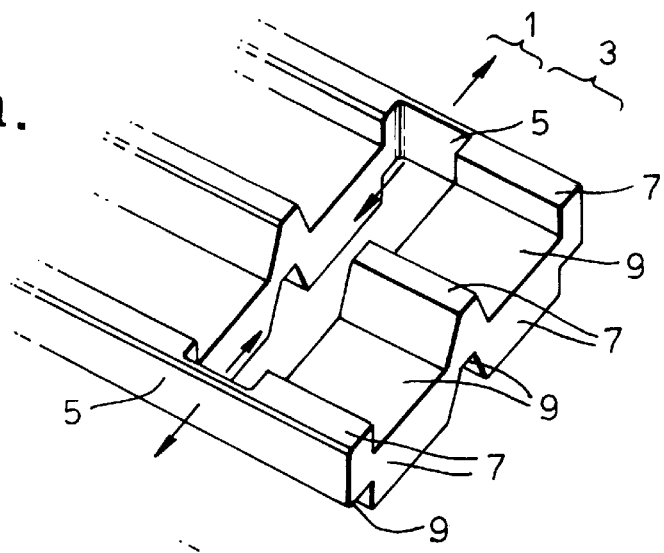
FIGS. 2(*a* and *b*), 3(*a* and *b*) and 4(*a* and *b*) show three forms of cable gripper strip used in cable splice closures according to the invention.
Figure 2B:
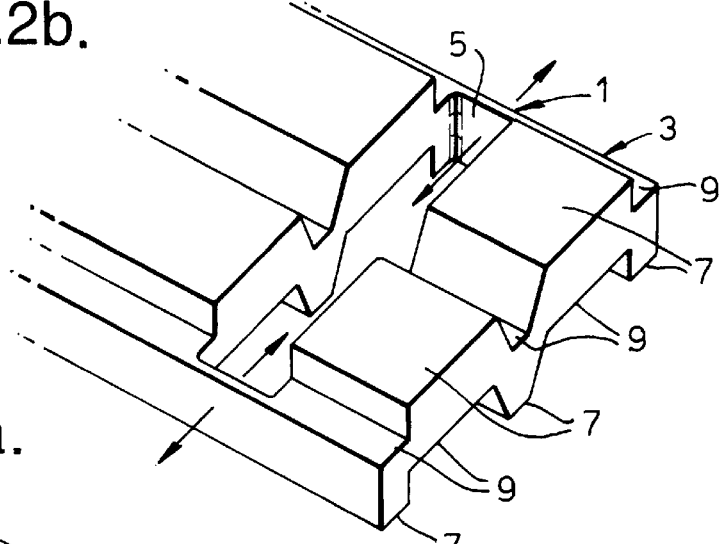
Figure 3A:
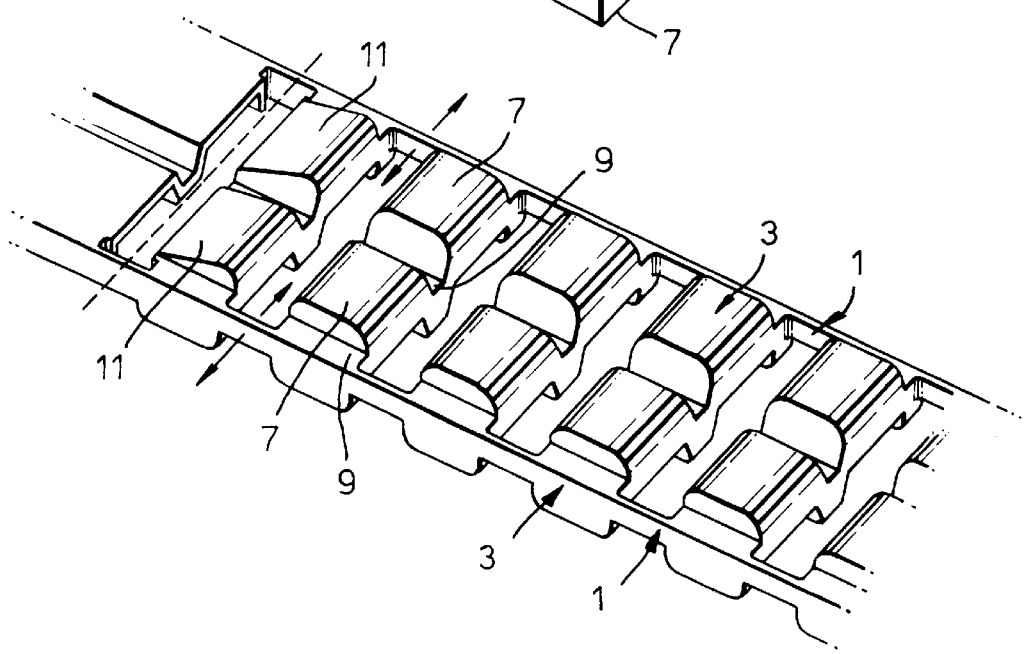
Figure 3:
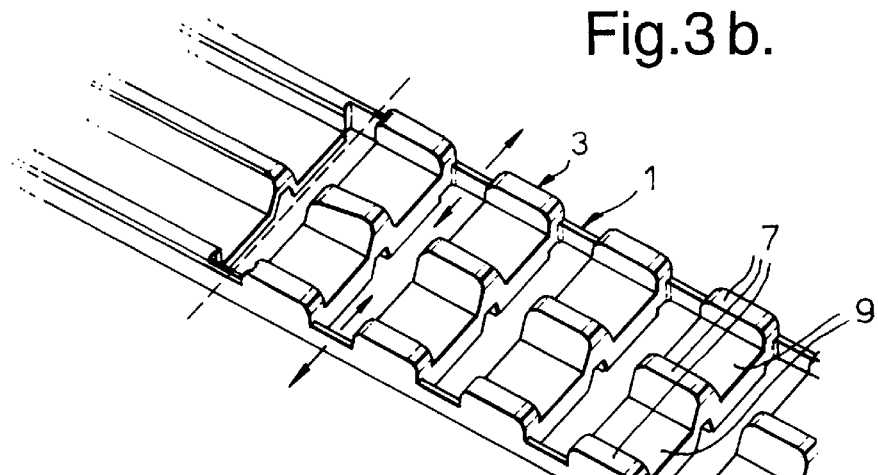
Figure 4:
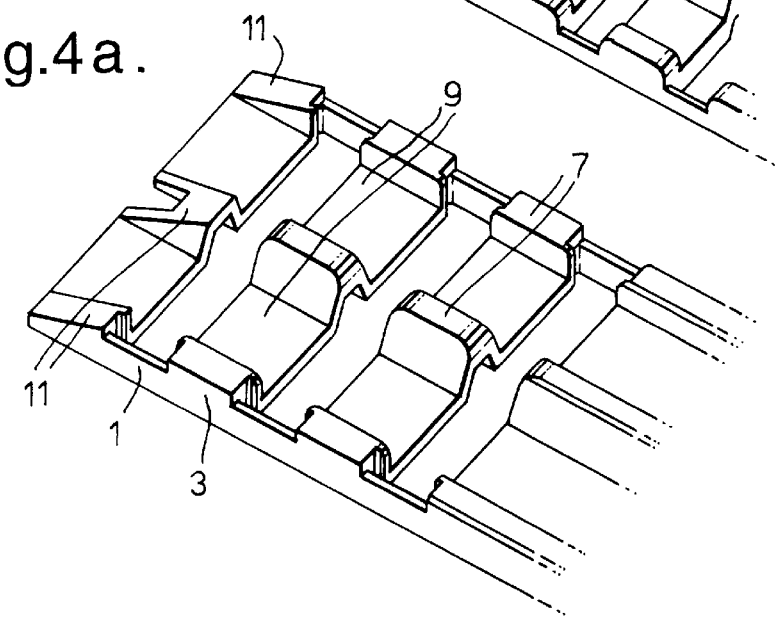
Figure 4:
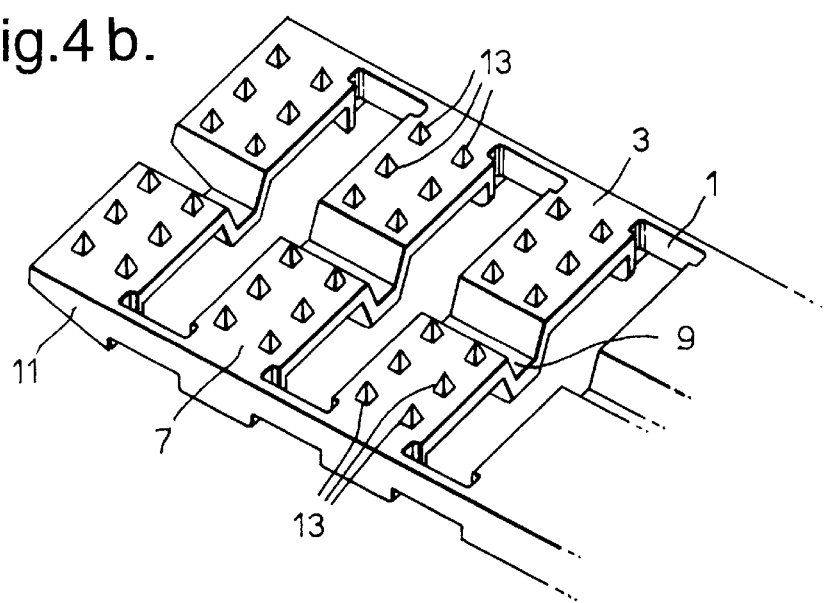

Three forms of cable gripper strip are shown in detail in FIGS. 2 to 4. FIGS. 2a and 2b show opposite sides of a first design of cable gripper strip. The strip comprises a plurality of alternately collapsible and non-collapsible portions along at least part of its length: only one collapsible portion 1 and one non-collapsible portion 3 are shown in these figures. The collapsible portion 1 comprises two webs 5 extending between two non-collapsible portions at the edges of the strip. The webs 5 can deform, e.g. by buckling or by being crushed, preferably outwardly and/or inwardly with respect to the rest of the strip in the direction of the arrows. This deformation is therefore preferably in a direction generally or substantially parallel to the axial direction of extension of a cable around which the strip is wound in use, such that substantially no gaps are formed between adjacent windings of the strip through which sealing material might be able to escape.

The strip of FIGS. 2a and 2b has protrusions 7 and recesses 9 which can engage corresponding recesses 9 and protrusions 7 of adjacent windings when, in use, the strip is wound around a cable etc. As mentioned above, this has the advantage of substantially preventing accidental axial displacement of the windings of the strip with respect to each other. Some of the protrusions may advantageously help the strip to grip a cable around which it is wound.

The cable gripper strips shown in FIGS. 3(a and b) are similar to that shown in FIG. 2, except that the designs of the recesses and protrusions are different. FIGS. 3a and 3b show opposite sides of one design of strip, and FIGS. 4a and 4b show opposite sides of another design of strip. Each of these strips, however, has alternately collapsible portions 1 and non-collapsible portions 3. Both designs of strip illustrated in FIGS. 3 and 4 have a tapered non-collapsible portion 11 which is intended to be located at the end of the strip (the strip of FIG. 3 may be severed at the dotted line) to smooth either the inner or outer end of the strip when wound. FIG. 4b shows a plurality of gripping protrusions 13 on one side of the strip for gripping a cable.

Figure 5:
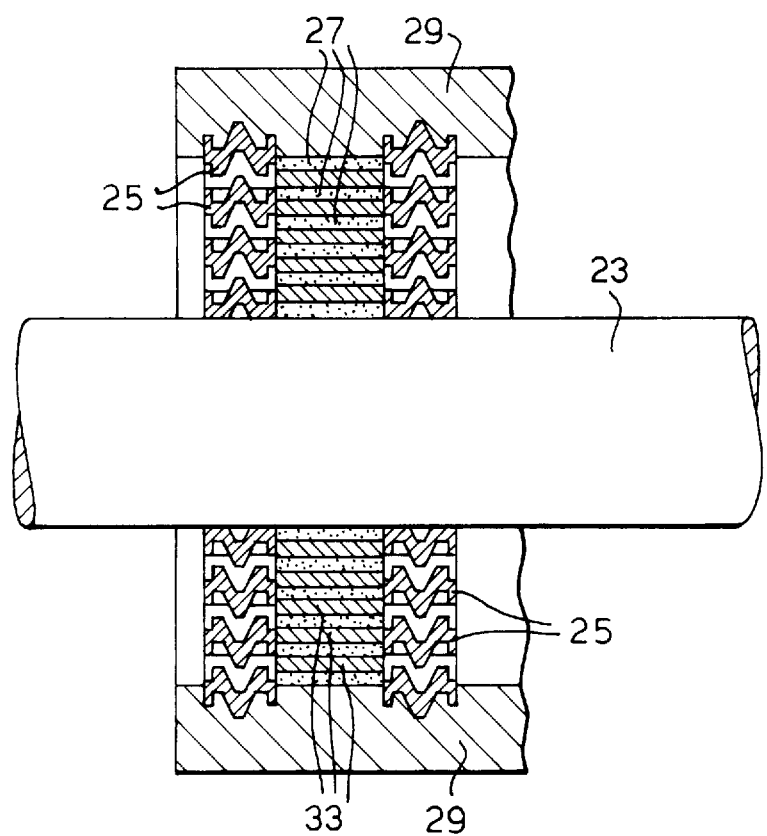
FIG. 5 shows, in cross-section, a detail of part of a preferred cable splice closure according to the invention.

FIG. 5 shows, in cross-section, a detail of an end of a preferred cable splice closure according to the invention. The casing 29 has been closed around a splice (not shown) and a cable 23 extending into the casing. A pair of cable gripper strips 25 have been wound around the cable 23 and have been compressed around the cable automatically upon closing the casing 29. Alternate windings of the cable gripper strips 25 are shown dark and light respectively, for clarity. Between the wound cable gripper strips 25 (which are located in recesses in the internal wall of the casing, thereby securing them to the casing) is sealing material 27 (e.g. gel). Also extending between the two cable gripper strips are connecting members 33 (shown as a series of dark bars), which may comprise webs or the like. Preferably, the sealing material 27 is in the form of a strip which has been wound around the cable 23 at the same time as the cable gripper strips 25 have been wound around the cable.

FIGS. 6 and 7 show two further forms of cable splice closure according to the invention being installed around a splice 21 between cables 23. In each case, the splice is a so-called "one-in, two-out" splice, i.e. one in which one cable branches into two cables. In FIGS. 6b and 6c, cable gripper strips, which are preferably substantially as described above and as shown in FIGS. 2 to 5, are shown wound around each cable 23. In FIG. 6c, an end part 35 of the cable splice closure has been positioned at each end of the splice. Each end part 35 comprises a support member in the form of two plates 37 between which is sealing material 27. Each support member plate (which is preferably substantially rigid) has a generally cruciform shape which arises by virtue of the fact that the generally circular plate has four transverse recesses 39, in the form of slots. Each cable gripper strip 25 wound around a cable 23 is inserted into a respective transverse recess 39, and is preferably retained there due to projections and recesses on the strip interlocking with cooperating ridges and grooves in the transverse recess. Inserting the cable gripper strips 25 into the transverse recess has also caused the cables 23 to extend through the recesses.

In the closure of FIG. 6, the sealing material 27 between the support member plates 37 has corresponding recesses pre-formed in it, to accommodate the cables 23. In the closure of FIG. 7, the sealing material 27 as shown in FIGS. 7d and 7e has no such pre-formed transverse recesses. As shown in FIG. 7c, each pair of support member plates 37 is installed on the cables 23 (such that the cable gripper strips 25 are inserted into the transverse recesses 39 and the cables 23 extend through the transverse recesses) before the sealing material 27 is inserted between the plates. The sealing material 27 may, for example, be wrapped as a strip around the cables, or positioned as a block (which is not necessarily, and preferably not, rigid) or the like between the support member plates 37. If the sealing material 27 is in the form of a block or the like, it may advantageously have slits or the like to enable the cables to be pushed into it. In whatever form the sealing material 27 is present, it may be installed around the cables at the same time as the support members, or before or after the support members, according to the particular design of the closure and/or the particular circumstances of the installation.

Figure 6A:
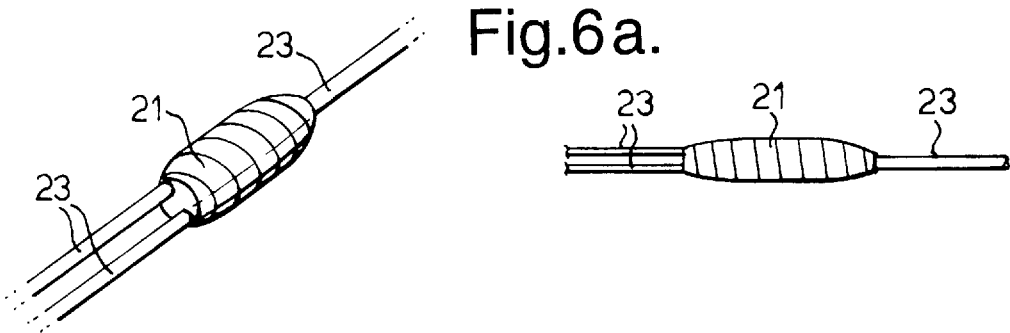
FIG. 6(a to e) shows another form of cable splice closure according to the invention being installed around a splice.
Figure 6B:
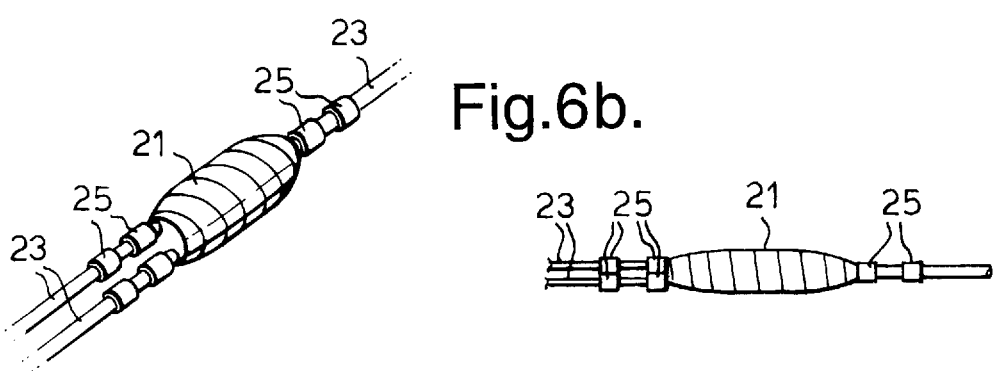
Figure 6C:
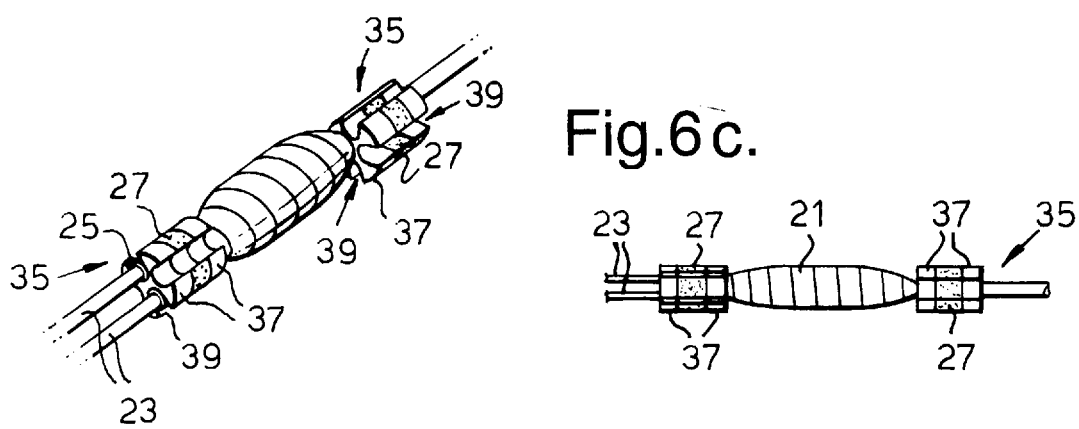
Figure 6D:
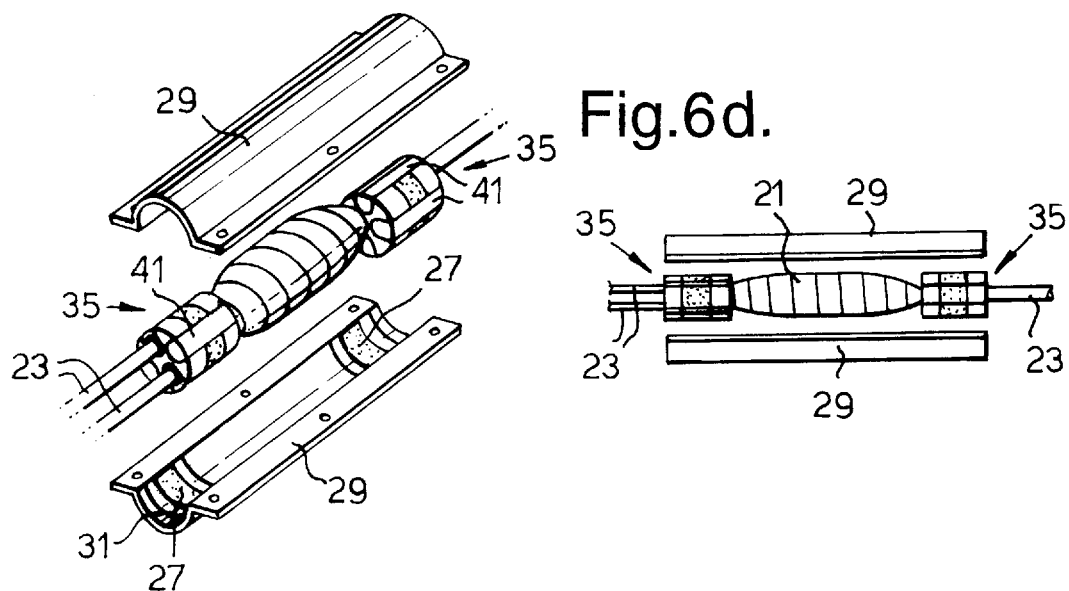
Figure 7A:
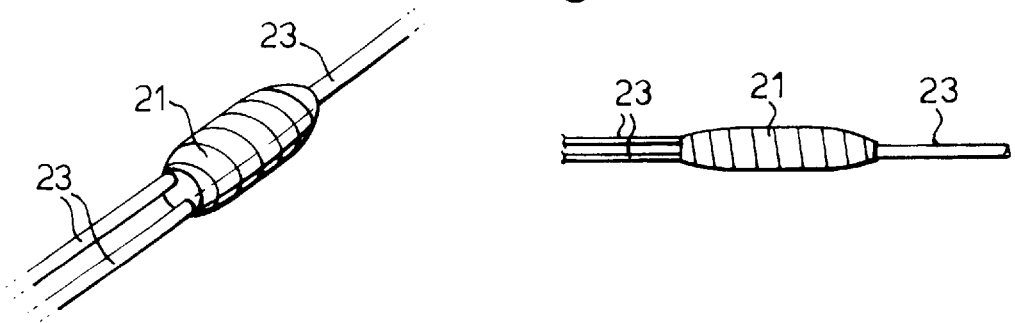
FIG. 7(a to f) shows a further form of cable splice closure according to the invention being installed around a splice.
Figure 7B:
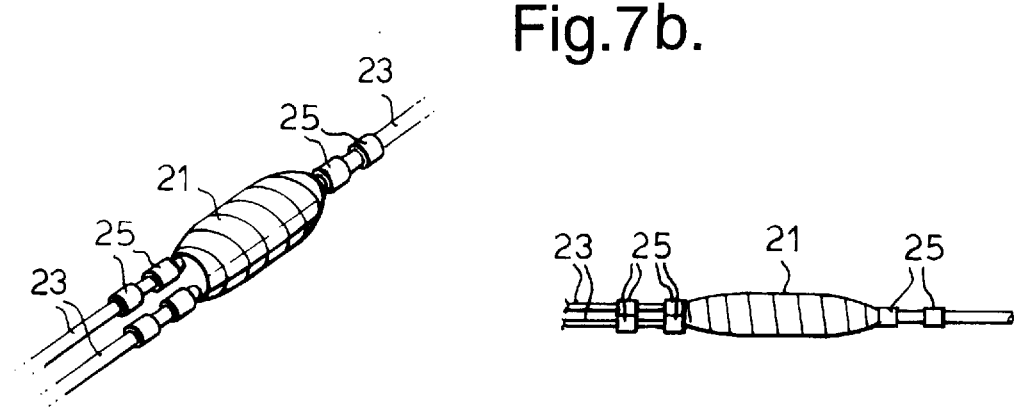
Figure 7C:
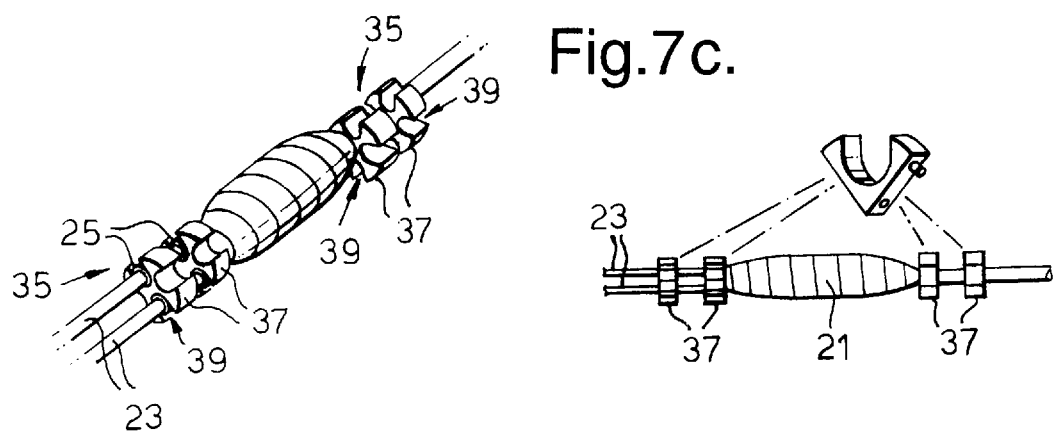
Figure 7D:
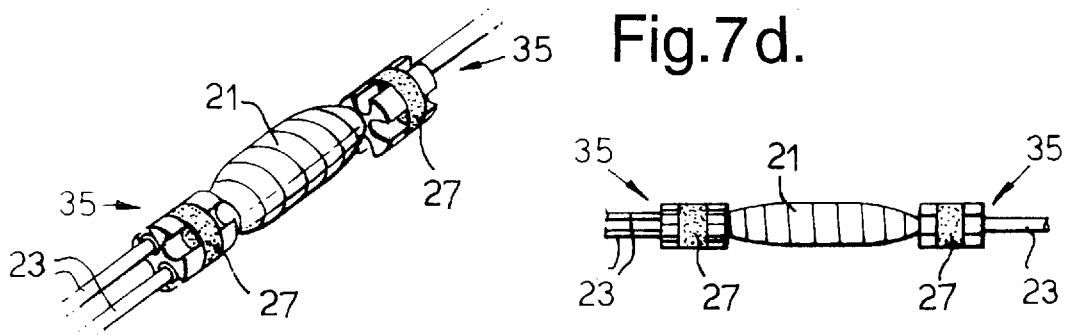
Figure 7E:
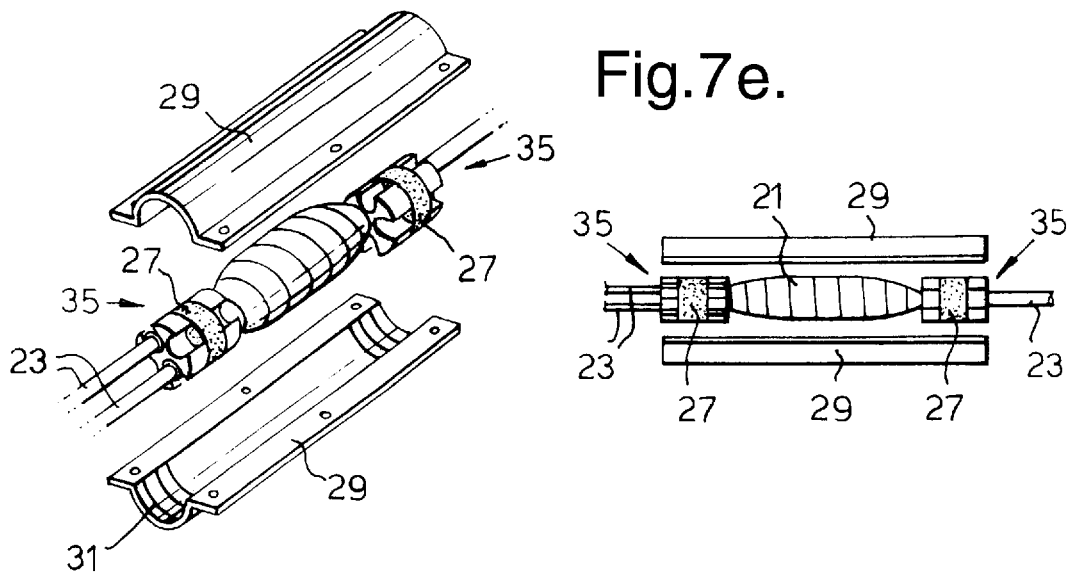
Figure 7F:
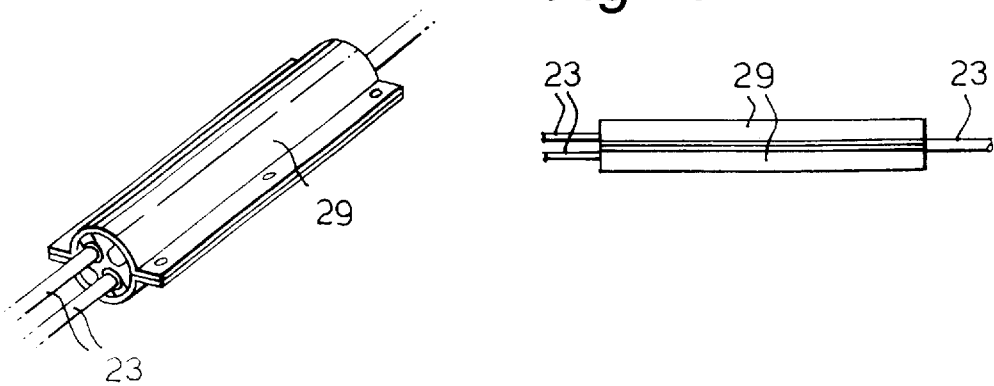

In FIGS. 6d and 7e, two half-shells of a casing 29 are about to be closed around the splice 21 and the end parts 35. In the transverse recesses of the end parts 35 of the closure shown in FIG. 6d which do not contain a cable, are plugs 41, which are provided to block off these empty recesses. The plugs 41 may include sealing material to ensure that the entire periphery of each end part forms a seal with the internal surface of the casing 29. Additionally or alternatively, the internal surface of the casing 29 may be provided with sealing material 27. With the closure of FIG. 7, plugs are not necessary because the sealing material 27 blocks off the recesses 39.

Figure 6E:
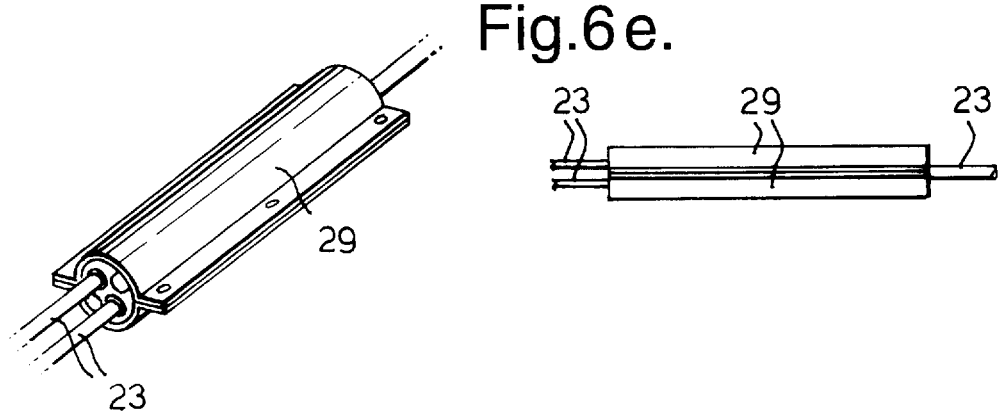

In FIGS. 6e and 7e, the casing 29 has been closed by bringing together the two half-shells and fastening together the longitudinal edges of the half-shells, e.g. in the same way as the closure shown in FIG. 1. Closing the casing 29 around the splice has applied pressure to the sealing material 27 between the support member plates 37. Additionally or alternatively, pressure can be applied to the sealing material 27 by moving the support member plates 37 of each pair relatively closer together, e.g. by means of one or more screws, bolts or other connecting members (not shown) extending between the plates. Closing the casing 29 has also automatically caused each cable gripper strip 25 situated in a respective transverse recess of a support member, to be tightened around the cable 23 extending through the recess and around which it has been wound. The cable gripper strips 25 have been tightened around the cables in this way because part of each strip protrudes from the recess in which it is situated, and closing the casing has automatically compressed each strip around its respective cable in the recess, causing the strip to contract and hence tighten around the cable.

Similarly to the closure of FIG. 1, the internal surface of the casing preferably has profiling 31 (e.g. transverse grooves and/or ridges) with which the support member plates 37 preferably cooperate (e.g. interlock) to secure the support members to the casing 29.

FIG. 7c includes a part 43 which comprises a part of a support member 37. The illustration of part 43 in FIG. 7c indicates that the support member plates 37 of some preferred cable splice closures according to the invention may be modular, comprising a plurality of parts (e.g. like parts 43) assembled together.

Figure 8A:
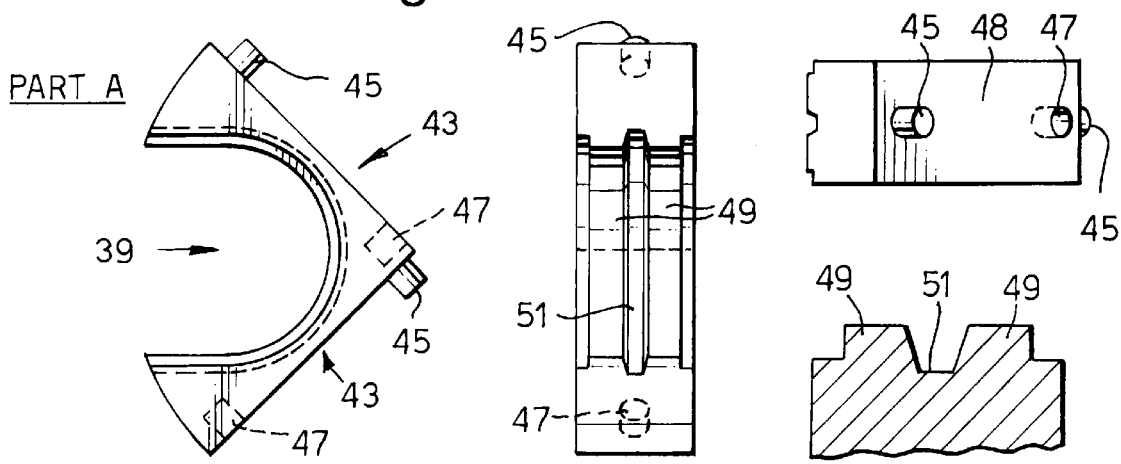
FIG. 8(a to c) shows several views of parts of a modular support member of a preferred cable splice closure according to the invention.
Figure 8B:
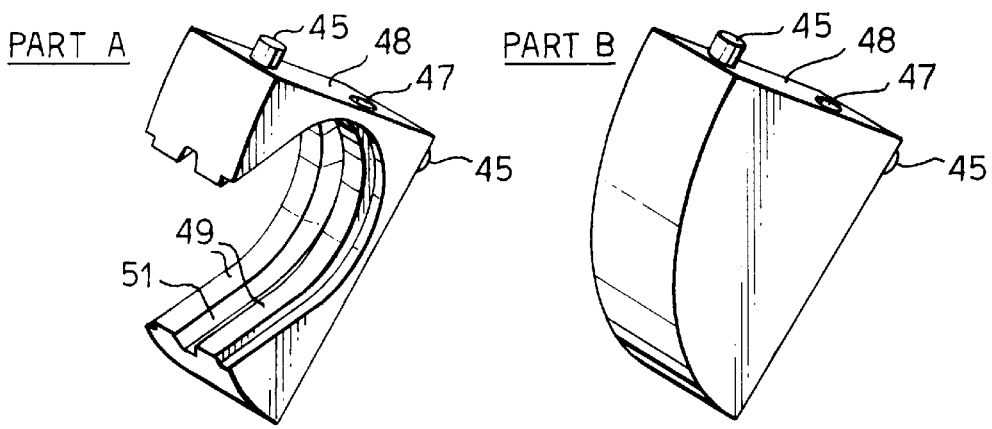
Figure 8C:
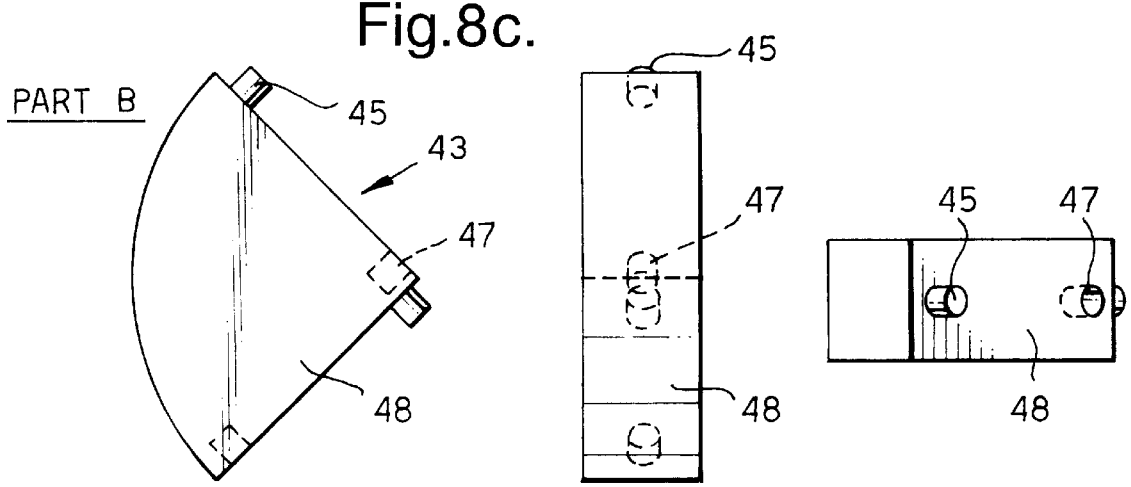
Figure 9A:
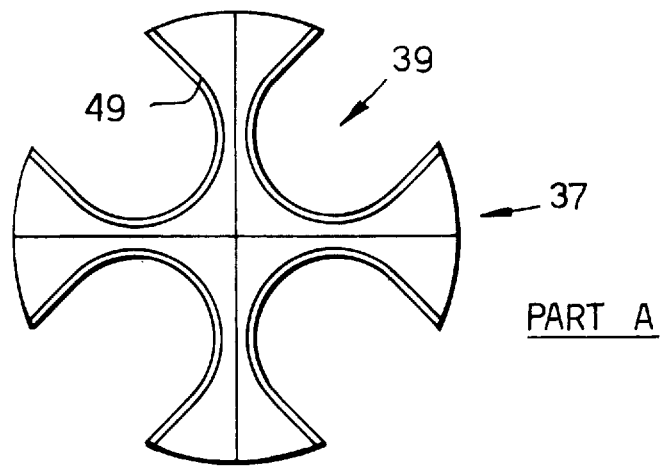
FIG. 9(a to c) shows three of the possible arrangements of a modular support member formed from parts as shown in FIG. 8.
Figure 9B:
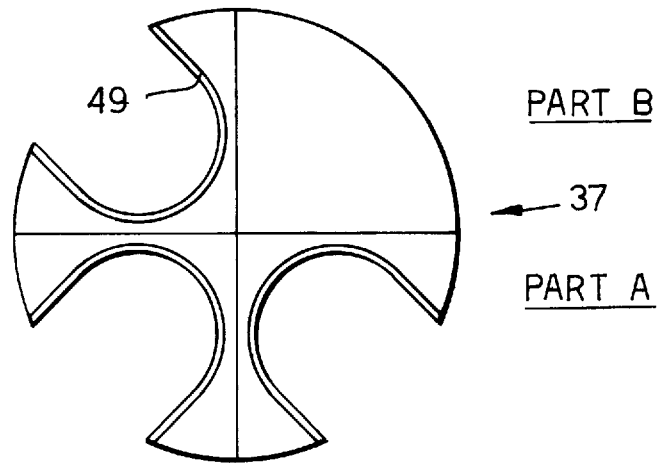
Figure 9C:
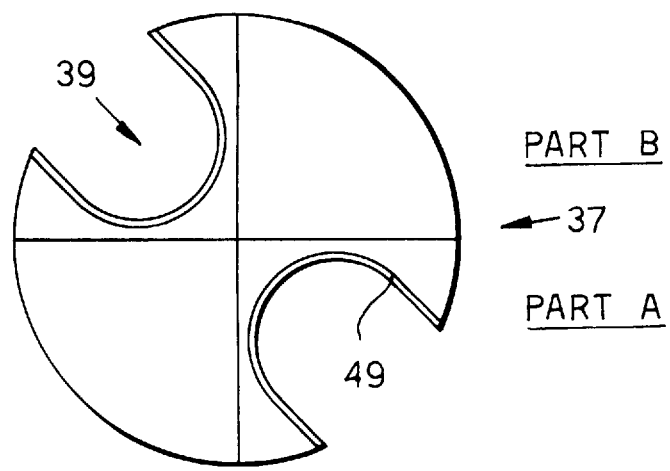

FIGS. 8 and 9 illustrate a particularly preferred form of modular support member plate 37 according to the invention. Each support member plate 37 may advantageously be formed from a kit of parts, the kit for example comprising one or more (preferably at least four) parts A (FIGS. 8a and 8b) and one or more (preferably at least three or four) parts B (FIGS. 8b and 8c). Each part A has a transverse recess 39 and each part B has no transverse recess. In order to assemble a modular support member having a desired number and/or arrangement of transverse recesses 39 (depending on how many cables 23 need to be accommodated, and how the cables are arranged), some of the parts 43 (parts A and/or B) may be selected from the kit and connected together.

In the embodiment illustrated in FIG. 8, each part 43 has a pin 45 and a hole 47 on each connecting face 48 and each of the parts 43 may be directly connected to another part 43 by bringing together connecting faces 48 of the two parts such that a pin 45 of one part is inserted into a hole 47 of the other part. Of course, it is to be understood that the parts 43 may be connected to each other by means of any other suitable arrangement of interlocking projections (e.g. pins) and openings (e.g. holes), or indeed in any other suitable way. Each part may be connected to one or more other members, e.g. acting as a frame, in addition to, or instead of, each part being directly connected to one or more other parts. In the embodiment shown in FIGS. 8 and 9, for example, each part 43 could be connected to a central cross-shaped frame.

FIG. 9 (a, b and c) shows three different possible arrangements of transverse recesses 39 in which a modular support member plate 37 according to the invention could be assembled. Other arrangements are, of course, possible (e.g. the support member plate could have only one or no transverse recesses 39).

Both FIGS. 8 and 9, but particularly FIG. 8, illustrate ridges 49 and grooves 51 in the transverse recesses 39, which cooperate with protrusions and recesses 7 and 9 in cable gripper strips 25 to retain the cable gripper strips in the recesses in use, and in particular substantially to secure the cable gripper strips to the support members in such a way that longitudinal movement (i.e. movement generally in the direction of extension of the cables) is substantially prevented.

We claim:

1. A cable splice closure, comprising:
   (a) a casing which, in use, is closed around a cable splice;
   (b) a cable gripper strip which, in use, is wound around a cable extending into the casing; and
   (c) means for decreasing the length of the cable gripper strip when the cable gripper strip is wound and compressed around the cable, and
      wherein closing the casing, in use, automatically compresses the cable gripper strip around the cable, causing the means for decreasing the length of the cable gripper strip to cause the cable gripper strip to decrease in length to tighten around the cable thereby gripping the cable.

2. A cable splice closure according to claim 1, comprising a support member which supports the cable gripper strip in use.

3. A cable splice closure according to claim 2, in which the support member has at least one opening in which the cable gripper strip is supported in use.

4. A cable splice closure according to claim 3, in which the at least one opening in the support member comprises a transverse recess.

5. A cable splice closure according to claim 4, in which, in use, the cable gripper strip is retained in the recess in which it is situated such that longitudinal movement of the cable gripper strip with respect to the support member is substantially prevented, and when the cable gripper strip grips the cable extending into the casing, the cable is consequently secured with respect to the support member.

6. A cable splice closure according to claim 5, in which, in use, prior to closing the casing, part of the cable gripper protrudes out of the recess in which it is situated, and closing the casing automatically forces at least some of the protruding part of the cable gripper into the recess and thereby urges the cable gripper against the said cable.

7. A cable splice closure according to claim 5, in which part of the casing protrudes into the recess in the support member when the casing is closed in use, and closing the casing in use automatically forces the cable gripper further into the recess in which it is situated, thereby urging the cable gripper against the said cable.

8. A cable splice closure according to claim 2, in which the support member is substantially rigid.

9. A cable splice closure according to claim 2, in which the support member is modular, comprising a plurality of parts assembled together.

10. A cable splice closure according to claim 2, in which the support member comprises at least two plates between which, in use, is sealing material.

11. A cable splice closure according to claim 10, in which the sealing material is selected from the group consisting of:
    (a) a gel;
    (b) a mastic; and
    (c) an elastomeric material.

12. A cable splice closure according to claim 1, which, in use, further comprises sealing material situated next to the cable gripper strip when the strip is wound around the cable.

13. A cable splice closure according to claim 12, in which the sealing material is selected from the group consisting of:
    (a) a gel;
    (b) a mastic; and
    (c) an elastomeric material.

14. A cable splice closure according to claim 12, in which the sealing material is situated between the cable gripper strip and a second cable gripper strip offset from the cable gripper strip along the cable when the cable gripper strip and second cable gripper strip are wound around the cable.

15. A cable splice closure according to claim 14, in which a connecting member, in use, extends between the cable gripper strip and second cable gripper strip when the cable gripper strip and second cable gripper strip are wound around the cable.

16. A cable splice closure according to claim 12, in which in use a compressive force is applied to the sealing material.

17. A cable splice closure according to claim 14, in which at least part of the compressive force is applied to the sealing material by forcing the cable gripper strip and second cable gripper strip relatively closer together.

18. A cable splice closure according to claim 16, in which at least part of the compressive force is applied to the sealing material by closing the casing.

19. A cable splice closure according to claim 1, in which the cable gripper strip comprises a collapsible portion, the cable gripper strip being able to decrease in length by means of the collapsible portion collapsing.

20. A cable splice closure according to claim 19, in which the collapsible portion of the cable gripper strip can collapse by deforming.

21. A cable splice closure, comprising:
    (a) a casing which, in use, is closed around a cable splice; and
    (b) a cable gripper strip which, in use, is wound around a cable extending into the casing;
        wherein the cable gripper strip can decrease in length when wound and compressed around the cable, and closing the casing, in use, automatically compresses the cable gripper strip around the cable, causing it to contract, and therefore to tighten, around the cable as a result of such a decrease in length, thereby gripping the cable;
        wherein the cable gripper strip comprises a collapsible portion, the cable gripper strip being able to decrease in length by means of the collapsible portion collapsing;
        wherein the collapsible portion of the cable gripper strip can collapse by deforming; and
        wherein the collapsible portion of the cable gripper strip comprises a web extending between substantially non-collapsible portions.

22. A cable splice closure, comprising:
    (a) a casing which, in use, is closed around a cable splice; and
    (b) a cable gripper strip which, in use, is wound around a cable extending into the casing;
        wherein the cable gripper strip can decrease in length when wound and compressed around the cable, and closing the casing, in use, automatically compresses the cable gripper strip around the cable, causing it to contract, and therefore to tighten, around the cable as a result of such a decrease in length, thereby gripping the cable;
        wherein the cable gripper strip comprises a collapsible portion, the cable gripper strip being able to decrease in length by means of the collapsible portion collapsing; and
        wherein the cable gripper strip comprises a plurality of alternating collapsible and substantially non-collapsible portions along at least part of a longitudinal length thereof.

23. A cable splice closure according to claim 1, in which the cable gripper strip is profiled such that, when wound around the cable in a substantially overlapping relationship in use, successive windings interlock with each other, thereby substantially preventing displacement of the windings with respect to each other along the cable.

24. A cable splice closure according to claim 1, in which the cable gripper strip has a plurality of protrusions on a surface thereof, to enhance the grip of the strip on the cable around which the strip is wound in use.

* * * * *

UNITED STATES PATENT AND TRADEMARK OFFICE
CERTIFICATE OF CORRECTION

PATENT NO. : 5,883,333
DATED : March 16, 1998
INVENTOR(S) : Wambeke, et al

It is certified that error appears in the above-identified patent and that said Letters Patent is hereby corrected as shown below:

In the title page, item [56] Referemce Cited, insert the following:

- 3,383,642   5/1968    Nava et al.
  4,002,818   1/1977    Kunze
  4,216,351   8/1980    Brandeau
  4,723,055   2/1988    Bisker
  5,346,742   9/1994    Dehling
  5,455,391   10/1995   Demesmaeker et al — item [56] Foreign Patent Documents:

0316911 A2   5/1989   EPO
0421254 A2   4/1991   EPO
DE 4135570 C1   11-1992   Germany
WO 95/15600   6/1995   PCT --

Signed and Sealed this

Thirteenth Day of July, 1999

Attest:

Attesting Officer

Q. TODD DICKINSON

Acting Commissioner of Patents and Trademarks